United States Patent [19]
Young

[11] Patent Number: 5,375,617
[45] Date of Patent: Dec. 27, 1994

[54] OVERRIDE CONTROL SYSTEM FOR AN AUTOMATIC SPRINKLER SYSTEM

[76] Inventor: Charles C. Young, 121 N. Almansor St., Alhambra, Calif. 91801

[21] Appl. No.: 251,905

[22] Filed: Jun. 1, 1994

[51] Int. Cl.[5] ............................................. F16K 17/36
[52] U.S. Cl. ................................ 137/78.3; 137/78.2; 137/624.12; 239/70
[58] Field of Search ............... 137/78.2, 78.3, 624.12; 239/64, 70

[56] References Cited

U.S. PATENT DOCUMENTS

| | | | |
|---|---|---|---|
| 2,577,337 | 12/1951 | Lancaster | 299/25 |
| 3,212,714 | 10/1965 | Davis et al. | 239/63 |
| 3,488,000 | 1/1970 | Cramer | 239/70 |
| 3,500,844 | 3/1975 | Sanner | 137/78 |
| 4,014,359 | 3/1977 | Sanner | 137/78 |
| 4,114,647 | 9/1978 | Sturman et al. | 239/70 |
| 4,541,446 | 9/1985 | Hogan | 137/78.2 |
| 4,613,764 | 9/1986 | Lobato | 307/116 |
| 4,838,296 | 6/1989 | Brooks | 137/78.3 |
| 4,919,165 | 4/1990 | Lloyd | 137/78.2 |
| 4,921,001 | 5/1990 | Pittsinger | 137/78.2 |
| 4,941,501 | 7/1990 | Bireley | 137/78.3 |

*Primary Examiner*—A. Michael Chambers

[57] ABSTRACT

An override control system for an automatic sprinkler system of the type having a control box with a timer for turning on and off at least one sprinkler valve, each sprinkler valve having a valve line which connects to a common line. The override control system includes a probe assembly, having a probe support, a probe having spaced apart electrically conductive members supported by the probe support, and a removable reservoir connectable to the probe support for containing the probe for above ground support while the probe assembly is being used above the ground. The reservoir is removable so that the electrically conductive members are in direct contact with ground dirt when the reservoir is removed and the members are positioned beneath the ground. An electrical circuit is positioned between each valve line and the common line. The electrical circuit includes a relay system so that if moisture between the electrically conductive members is above a predetermined threshold the relay system of the electrical circuit will be activated inhibiting sprinkler operation. If moisture between the electrically conductive members is below the predetermined threshold, the relay system will not energize, thereby allowing said sprinkler system to operate normally.

3 Claims, 2 Drawing Sheets

OVERRIDE CONTROL SYSTEM FOR AN AUTOMATIC SPRINKLER SYSTEM

BACKGROUND OF THE INVENTION

1. Field of the Invention

The present invention relates to control systems and, more particularly to systems for controlling the operation of lawn sprinklers.

2. Description of the Related Art

Numerous automatically controlled lawn sprinkler systems have heretofore been proposed. A major disadvantage of many of these is that no provision is made for turning off the sprinklers automatically during periods of natural rainfall. For example, automatic sprinkler systems are usually set to turn on in the early morning or late evening to avoid inconvenience to pedestrians and to gain the best watering effect it is exceptionally inconvenient to shut off the sprinkler when most of the people are sleeping in those hours. When early morning rain or late night rain occurs, enough water has been accumulated. Therefore, no watering from sprinklers is required. Consequently, such systems waste water and, in addition, may over water and damage the grass in lawns in which they are employed.

This problem has heretofore been recognized, and several attempts have been made to solve it.

For example, U.S. Pat. No. 3,500,844 discloses the use of two sets of spaced apart conductive members which are fixed. Rain impinging on the base closes the switch by completing a circuit between the conductive members (see col. 2, l's. 9–14 and col. 3, l's 65 to 75).

U.S. Pat. No. 4,919,165 discloses an electrical fluid level monitoring switch secured to a pair of conductors (col. 6, l's 61–64). The '165 invention uses a floating device to provide electrical contact (see col. 7, l's 16–24).

Other patents revealed in a patent search include:
U.S. Pat. Nos. 4,613,764, 3,212,714, 2,577,337, and 4,014,359.

SUMMARY OF THE INVENTION

An override control system for an automatic sprinkler system of the type having a control box with a timer for turning on and off at least one sprinkler valve, each sprinkler valve having a valve line which connects to a common line. The override control system includes a probe assembly, having a probe support, a probe having spaced apart electrically conductive members supported by the probe support, and a removable reservoir connected to the probe support for containing the probe for above ground support while the probe assembly is being used above the ground. The reservoir is removable so that the electrically conductive members are in direct contact with ground dirt when the reservoir is removed and the members are positioned beneath the ground. An electrical circuit is positioned between each valve line and the common line. The electrical circuit includes a relay system so that if moisture between the electrically conductive members is above a predetermined threshold the relay system of the electrical circuit will be activated inhibiting sprinkler operation. If moisture between the electrically conductive members is below the predetermined threshold, the relay system will not energize, thereby allowing said sprinkler system to operate normally.

DETAILED DESCRIPTION OF THE PREFERRED EMBODIMENTS

Figure 1:
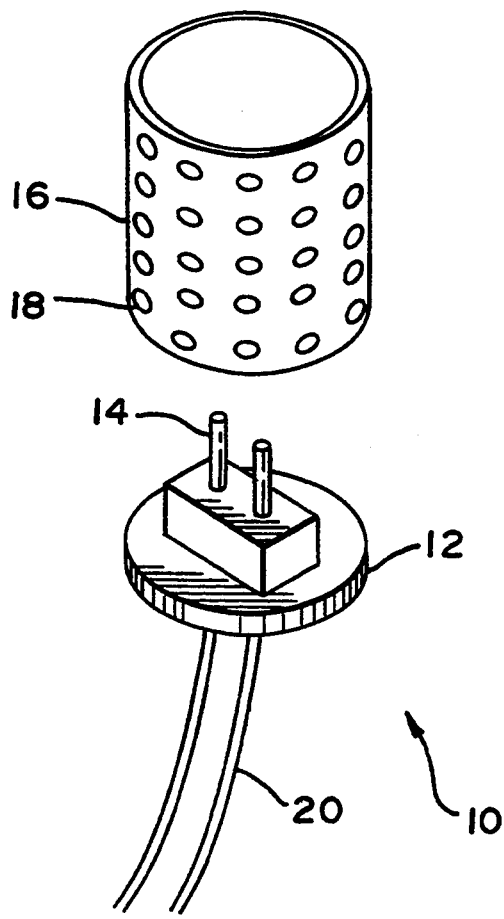
FIG. 1 is an exploded perspective illustration of the probe assembly of the present invention.

Referring now to the drawings and the characters of reference marked thereon, FIG. 1 illustrates a preferred embodiment of the probe assembly of the present invention, designated generally as 10. Probe assembly 10 includes a probe support 12 which supports spaced apart electrically conductive members 14. A soil container or reservoir 16 may be attached to the probe support 12 by friction fit, threads or other suitable removable attachment means. Reservoir 16 is preferably formed of plastic. It includes holes which provide for the escape of water. Wires 20 provide connection to an electrical circuit 22 (see FIG. 4) with a relay system, as will be described below in more detail.

Figure 2:
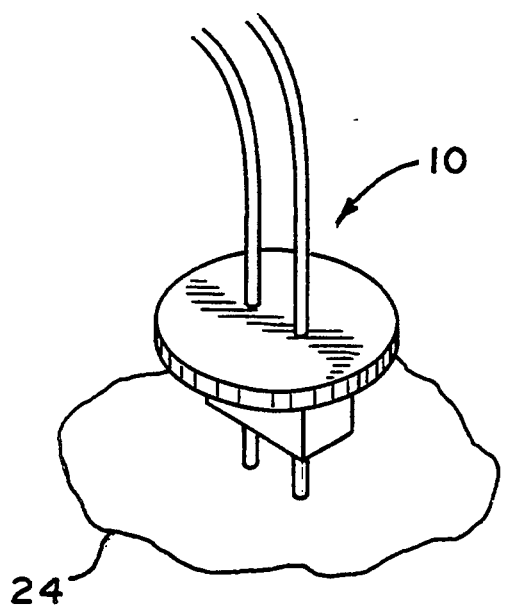
FIG. 2 is a perspective illustration of the probe assembly being used with the reservoir detached for on-ground installation.

Referring now to FIG. 2, when the probe assembly 10 is placed on the ground 24, so that the conductive members 14 extend into the soil, moisture in the ground soil above a pre-determined threshold activates the relay system.

Figure 3:
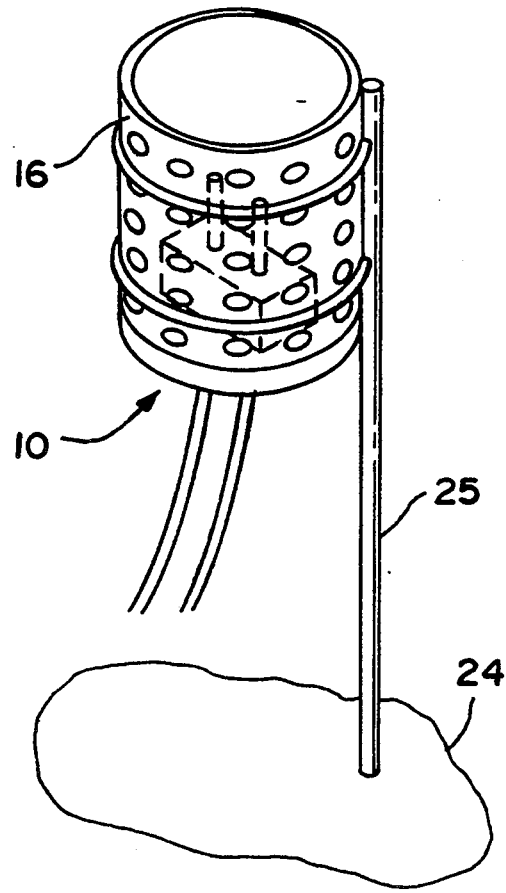
FIG. 3 is a perspective illustration of the probe assembly being used with the reservoir attached for above-ground installation.

Referring now to FIG. 3, in an alternate mode of operation, the probe assembly 10 is placed above the ground 24, cement or other surface, with the reservoir 16 installed so that the conductive members 14 extend into soil placed in the reservoir 16. In this instance moisture in the soil or equivalent, e.g., sponge, so placed within the reservoir 16 simulates actual ground, which, when it accumulates above a pre-determined threshold, activates the relay system. In this alternate mode the probe assembly 10 may be supported by an appropriate stand 25. The probe assembly 10 is placed so as to receive approximately the same amount of water as the ground soil 22. Such an alternate mode of operation may be particularly preferable when no ground, e.g., soil, is available nearby.

Figure 4:
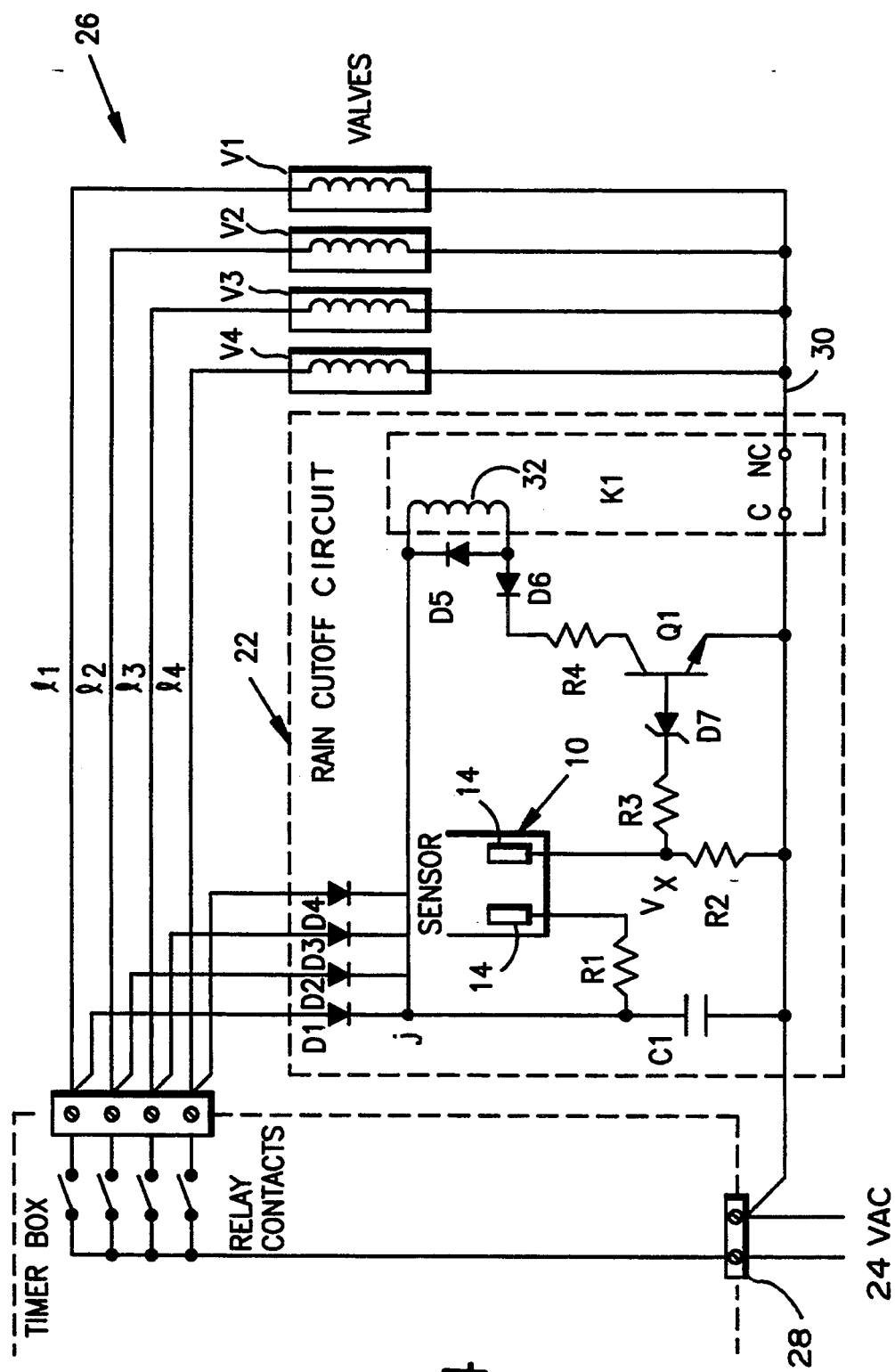
FIG. 4 is a schematic illustration of the electrical circuit for the override control system of the present invention.

Referring now to FIG. 4, the rain cutoff electrical circuit 22 of the present invention is illustrated in conjunction with the environment of a typical automatic sprinkler system, designated generally as 26. Such a typical system 26 uses a 24 VAC power source 28 connected to a timer box. A parallel supply of valve lines 11–14 are connected to respective valves V1–V4. The valves are connected through a common line 30 to the power supply 28.

The electrical circuit 22 is positioned between each valve line 11–14 and the common line 30. Each diode (D1, D2, D3, and D4) is electrically connected at its anode to a respective relay contact of a valve line, and at its cathode to a common junction j. Each diode provides half-wave rectification of the voltage of each valve to the point j. The junction j is electrically connected to one of the electrically conductive members 14 of the probe assembly 10 by resistor R1.

A capacitor C1 is connected at a first end to the junction j and at a second end to the common line 30. A resistor R3 is connected at a first end to a second of the electrically conductive members 14 at a point X, the point X being connected to the common line through resistor R2. A Zener diode D7 is connected at a cathode to R3. A transistor Q1 has a base connected to an anode of D7, Q1 having an emitter connected to common line 30.

A resistor R4 has a first end connected to the collector of Q1. A diode D6 has a cathode connected to the second end of R4. A diode D5 has an anode connected to the anode of D6, and a cathode connected to junction j.

A relay K1 has a relay coil 32 connected at a first end to the anode of D5, a second end of the relay coil being connected to the junction j.

R1 and R2 are provided for adjusting the threshold and for safety purposes.

If moisture between the electrically conductive members 14 is above a predetermined threshold the transistor Q1 will turn on and supply current to the relay coil 32, thereby energizing the relay K1 and opening the common line, inhibiting sprinkler operation. If moisture between the electrically conductive members 14 is below the predetermined threshold, the transistor Q1 will not turn on and the relay will not energize, thereby allowing the sprinkler system to operate normally.

Exemplary component values are given below for the purpose of illustration:

R1=22 kΩ, ¼ W
R2=22 kΩ, ¼ W
R3=10 kΩ, ¼ W
R4=470 Ω, ¼ W
C1=330 μF
D1-D7=IN4001
D7=12 V, 1 W
Q1=2N3903 (min $h_{fe}$=50) Motorola
K1=24 VDC coil relay (1440 Ω coil) Omron The rain cut-off electrical circuit 22 also functions as a moisture detector which can be used alone without the presence of a timer. When the circuit 22 and probe 10 detects moisture level below the predetermined threshold, the circuit will energize the solenoid valves for watering. If desired, the circuit 22 can be combined with a light sensor and a delay circuit which energizes the solenoid valves for watering only in the night time.

The present invention is quite safe, operating at a low operating voltage of about 13 VDC, and with low operating amperes—about 1.5 mA, which is under the potential shock hazards level.

Obviously, many modifications and variations of the present invention are possible in light of the above teachings. It is, therefore, to be understood, within the scope of the appended claims, the invention may be practiced otherwise then as specifically described.

What is claimed and desired to be secured by Letters Patent of the United States is:

1. An override control system for an automatic sprinkler system of the type having a control box with a timer for turning on and off at least one sprinkler valve, each said valve having a valve line which connects to a common line, said override control system, comprising:
   a probe assembly, comprising:
   a) a probe support;
   b) a probe comprising spaced apart electrically conductive members supported by said probe support; and
   c) a removable reservoir connectable to said probe support for containing said probe for above ground support while said probe assembly is being used above the ground and being removable so that said electrically conductive members are in direct contact with ground dirt when said reservoir is removed and said members are positioned beneath the ground; and,
   an electrical circuit positioned between each said valve line and said common line, said electrical circuit including a relay system wherein if moisture between said electrically conductive members is above a predetermined threshold said relay system of said electrical circuit will be activated inhibiting sprinkler operation and wherein if moisture between said electrically conductive members is below said predetermined threshold, said relay system will not energize, thereby allowing said sprinkler system to operate normally.

2. An override control system for an automatic sprinkler system of the type having a control box with a timer for turning on and off at least one sprinkler valve, each said valve having a valve line which connects to a common line, said override control system, comprising:
   a probe assembly comprising:
   a) a probe support, and,
   b) a probe comprising spaced apart electrically conductive members supported by said probe support; and,
   c) a removable reservoir connectable to said probe support for containing said probe for above ground support while said probe assembly is being used above the ground and being removable so that said electrically conductive members are in direct contact with ground dirt when said reservoir is removed and said members are positioned beneath the ground; and
   an electrical circuit positioned between each said valve line and said common line, comprising:
   a) a plurality of diodes (D1, D2, ...) each diode being electrically connected at its anode to a respective valve line, and at its cathode to a common junction j, each diode providing half-wave rectification of the voltage of each valve to said point j, said junction j being electrically connected to one of said electrically conductive members;
   b) a capacitor being connected at a first end to said junction j and at a second end to a common line;
   c) a resistor (R3) being connected at a first end to a second of said electrically conductive members at a point X, said point X being connected to said common line;
   d) a Zener diode (D7) being connected at a cathode to said R3;
   e) a transistor (Q1) having a base connected to an anode of said D7, said Q1 having an emitter connected to said common line, and a collector;
   f) a resistor (R4) having a first end connected to said collector, and a second end;
   g) a diode (D6) having a cathode connected to said second end of R4, and an anode;
   h) a diode (D5) having an anode connected to said anode of said D6, and a cathode connected to junction j; and,
   i) a relay having a relay coil connected at a first end to said anode of D5, a second end of said relay coil being connected to said junction j;

wherein if moisture between said electrically conductive members is above a predetermined threshold said transistor will turn on and supply current to said relay coil, thereby energizing said relay and opening said common line, inhibiting sprinkler operation and wherein if moisture between said electrically conductive members is below said predetermined threshold, said transistor will not turn on and said relay will not energize, thereby allowing said sprinkler system to operate normally.

3. The override control system of claim 1 further comprising a resistor (R1) connected between said junction j and the first of said electrically conductive members, and a resistor (R2) being connected between said point X and said common line, said resistors R1 and R2 being provided for adjusting said threshold.

* * * * *